H. WOODS, DEC'D.
A. WOODS, ADMINISTRATRIX.
WATER FILTER.
APPLICATION FILED AUG. 20, 1910.

1,141,744.

Patented June 1, 1915.
2 SHEETS—SHEET 2.

WITNESSES

INVENTOR
Harry Woods
by Bakewell, Byrnes & Parmelee
his Attorneys

UNITED STATES PATENT OFFICE.

HARRY WOODS, OF STEUBENVILLE, OHIO; ALLIE WOODS ADMINISTRATRIX OF SAID HARRY WOODS, DECEASED.

WATER-FILTER.

1,141,744. Specification of Letters Patent. Patented June 1, 1915.

Application filed August 20, 1910. Serial No. 578,185.

*To all whom it may concern:*

Be it known that I, HARRY WOODS, a resident of Steubenville, Jefferson county, Ohio, have invented a new and useful Improvement in Water-Filters, of which the following is a full, clear, and exact description, reference being had to the accompanying drawings, forming part of this specification.

My invention has relation to water filters, and is designed to provide a filter which can readily be washed without removing any of its various parts, and from which the filtering screens can readily be removed for cleansing or repairing.

Another object of my invention is to provide ample space adjacent to the filtering screens in which the material filtered from the water can flow by gravity, so that it will be out of the path of the water passing through the filter, and which space can readily be drained without stopping the flow of the filtered water.

The precise nature of my invention will be best understood by reference to the accompanying drawings, which will now be described, it being premised, however, that various changes may be made in the details of construction and general arrangement of the parts without departing from the spirit and scope of my invention as defined in the appended claims.

Figure 1:
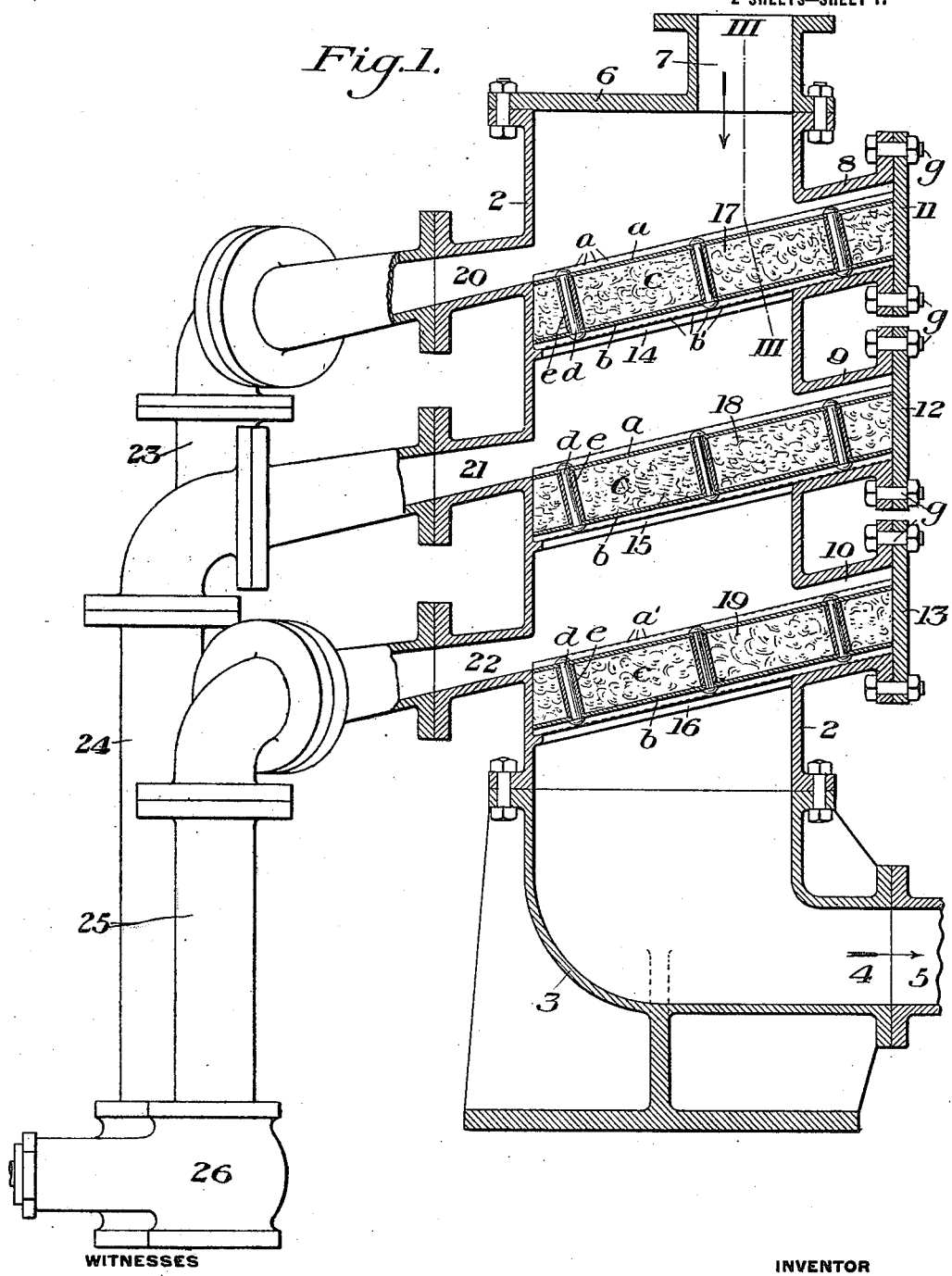
Figure 2:
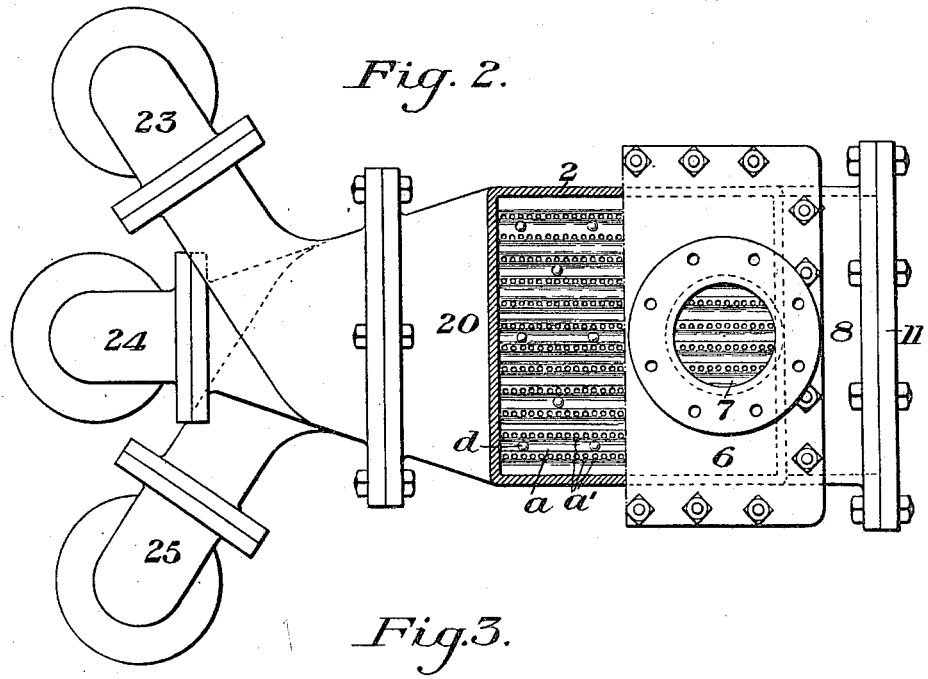
Figure 3:
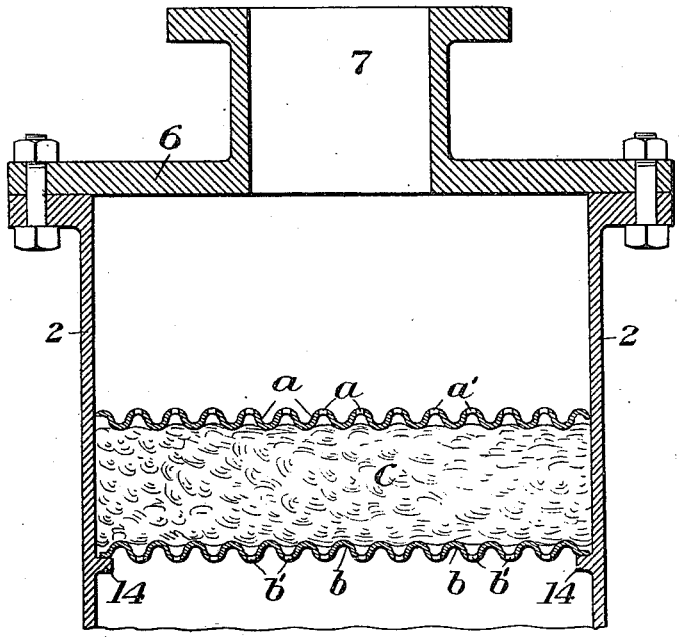

Figure 1 is a side elevation, partially in section of one form of my improved filter. Fig. 2 is a plan view partially in section, and Fig. 3 is a detailed sectional view on the line III—III of Fig. 1.

Referring to the accompanying drawings, the numeral 2 designates the filter casing supported on a hollow base 3, which is provided with an outlet opening 4.

5 is an outlet pipe for the filtered water leading from the opening 4.

6 is a cover which is connected to the top of the casing 2 and is provided with an inlet 7, which may be connected to any suitable source of water supply. Projecting from the one side of the casing 2 are the hollow extensions 8, 9 and 10. These extensions are rectangular in cross-section and are provided with caps or covers 11, 12 and 13, respectively. These covers are secured to projecting flanges on the extensions by means of the bolts $g$. Within the casing are the flanges 14, 15 and 16. The upper edge of each of these flanges forms a continuous edge on the bottom of the inner face of the hollow extensions 8, 9 and 10 respectively. I have shown these extensions as being formed integrally with the casing, but it will be readily understood that these flanges might be secured to the casing in any suitable manner.

17, 18 and 19 are filtering screens within the casing 2, and are supported on the respective flanges 14, 15 and 16, and the bottom of the hollow extensions. Extending from the side of the casing opposite the hollow extensions are the outlets 20, 21 and 22. The outlet 20 leads outwardly from a point immediately above the screen 17 to a pipe 23, the bottom of said outlet being approximately in the same plane as the top of the screen 17, and the outlets 21 and 22 lead outwardly from a point above the screens 18 and 19 respectively to outlet pipes 24 and 25 through which the refuse flowing down the screens is flushed when water is passed through the pipes 23, 24 and 25. Each of these pipes is provided with a valve 26 for the purpose hereinafter described.

Each of the filtering screens comprises two corrugated plates $a$ and $b$, and a filler of hair or other suitable filtering material $c$ between the plates. The plates $a$ of each screen are provided with a plurality of openings $a'$ along the apex of each corrugation, and each plate $b$ is provided with similar openings $b'$. The plates $a$ and $b$ of each screen are secured to each other by means of rivets $d$, and $e$ are bushings surrounding the rivets and interposed between the plates $a$ and $b$, and are adapted to space the plates the proper distance from each other.

As can be seen by reference to the drawings, the filter screens are slightly inclined, and the outlets 20, 21 and 22 are also inclined at approximately the same angle as the inclination of the screen. The bottom of each of these outlets forms a continuation of the depressed portion of the corrugated plates on the top of the screen.

The operation of the device is as follows: The water to be filtered enters through the opening 7 and passes through the screens 17, 18 and 19. The major portion of the dirt or refuse will fall into the depressed portions of the corrugated plate $a$ of the screen 17, the water passing through the orifices $a'$ in the apex of the corrugations. The dirt and refuse will flow by gravity along the bottom of the depressions in the top plate of the screen 17 into the outlet 20 and thence into the outlet pipe 23. If any refuse should pass through the screen 17, it will be caught by the screen 18 and will flow into the outlet 21, while any material which is caught by the screen 19 will flow into the outlet 22. After the filter has been run for a pre-determined time, the valves controlling the pipes 23, 24 and 25, can be opened successively to drain off the refuse caught by the screens. If it is desired to remove any of the screens for repairs or thorough cleansing, the plates 11, 12 and 13 can be removed, and the screens pulled out endwise, and after they receive the proper attention they can be inserted in place and the covers secured to seal the filter.

The advantages of my invention result from the provision of a filter from which the filtering screens can be readily removed without dismantling the filter. Another advantage results from the provision of a depository adjacent to each of the screens into which the refuse filtered from the water passing through the filter will flow by gravity, and from which the refuse can be removed without stopping the flow of water through the filter.

It will readily be understood by those familiar with the art that a filter of this character may be made in which only one screen is used.

I claim:

1. A filter having a vertically disposed casing, said casing having an inlet at the top thereof and an outlet at the bottom for the liquid to be filtered, a filter screen within said casing disposed at an angle to the vertical and horizontal planes of said casing, a depository extending outwardly from the casing at one side thereof adjacent to the top of the screen, the entrance to said depository being approximately the same width as the screen, to permit the material filtered from the liquid to freely pass into said depository from edge to edge of the screen, substantially as described.

2. A filter having a vertically disposed rectangular casing, said casing having an inlet at the top thereof and an outlet at the bottom for the liquid to be filtered, a plurality of filter screens within said casing disposed at an angle to the vertical and horizontal planes of said casing, a plurality of depositories extending outwardly from the casing at one side thereof, there being a depository adjacent to each screen, the entrance to each depository being approximately the same width as the screen, to permit the material filtered from the liquid to freely flow from the tops of the screens into the depositories from edge to edge thereof, substantially as described.

In testimony whereof, I have hereunto set my hand.

HARRY WOODS.

Witnesses:
E. De Witt Erskine,
J. C. Bigger.

Copies of this patent may be obtained for five cents each, by addressing the "Commissioner of Patents, Washington, D. C."